Dec. 5, 1961 W. P. REID 3,011,745
CLAMP FOR SUPPORTING WIRES OR CONDUITS
Filed June 1, 1959 2 Sheets-Sheet 1
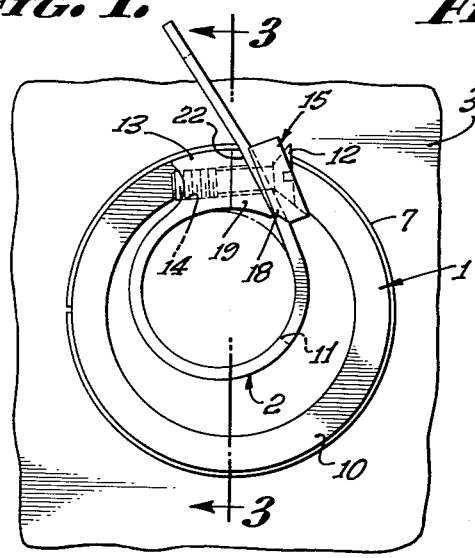
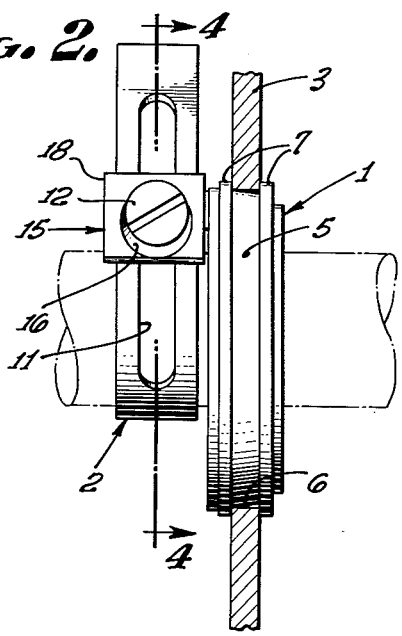
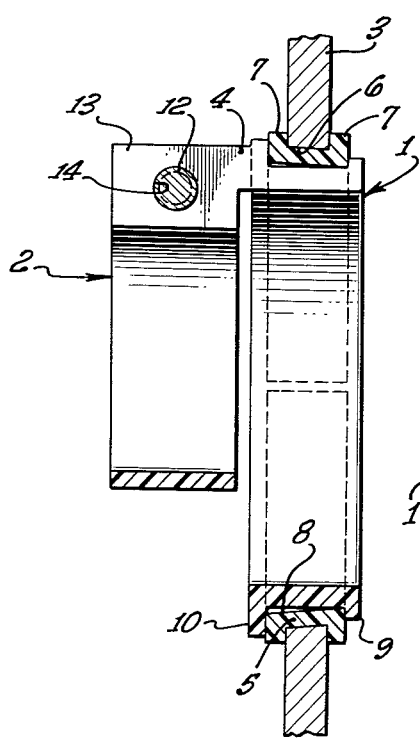
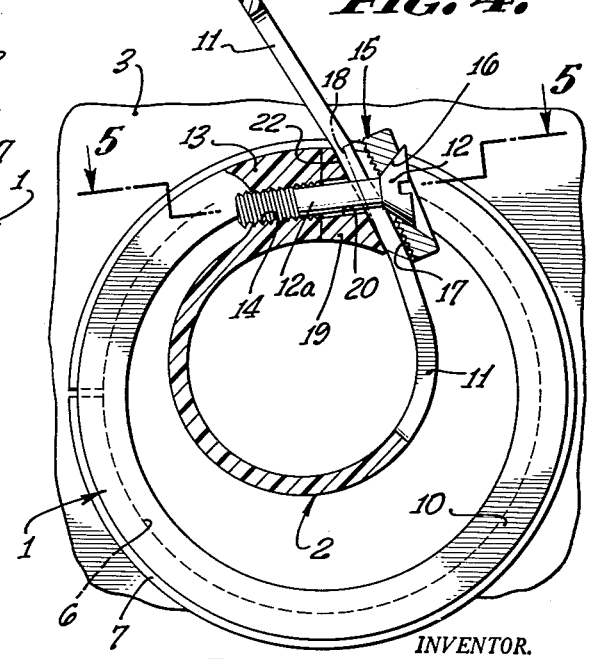
INVENTOR.
WILLIAM P. REID
BY
Paul A. Weilein
ATTORNEY.

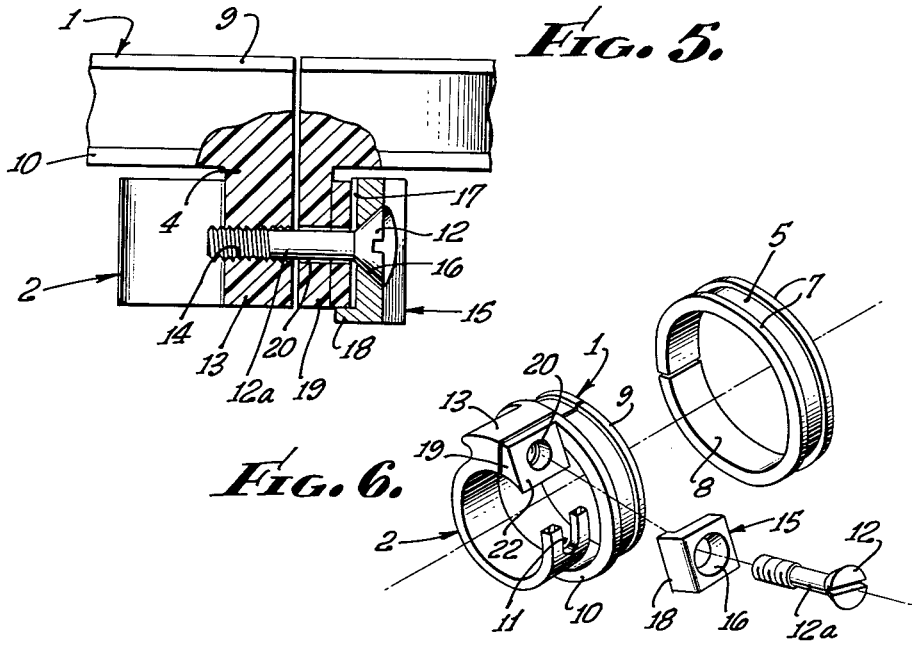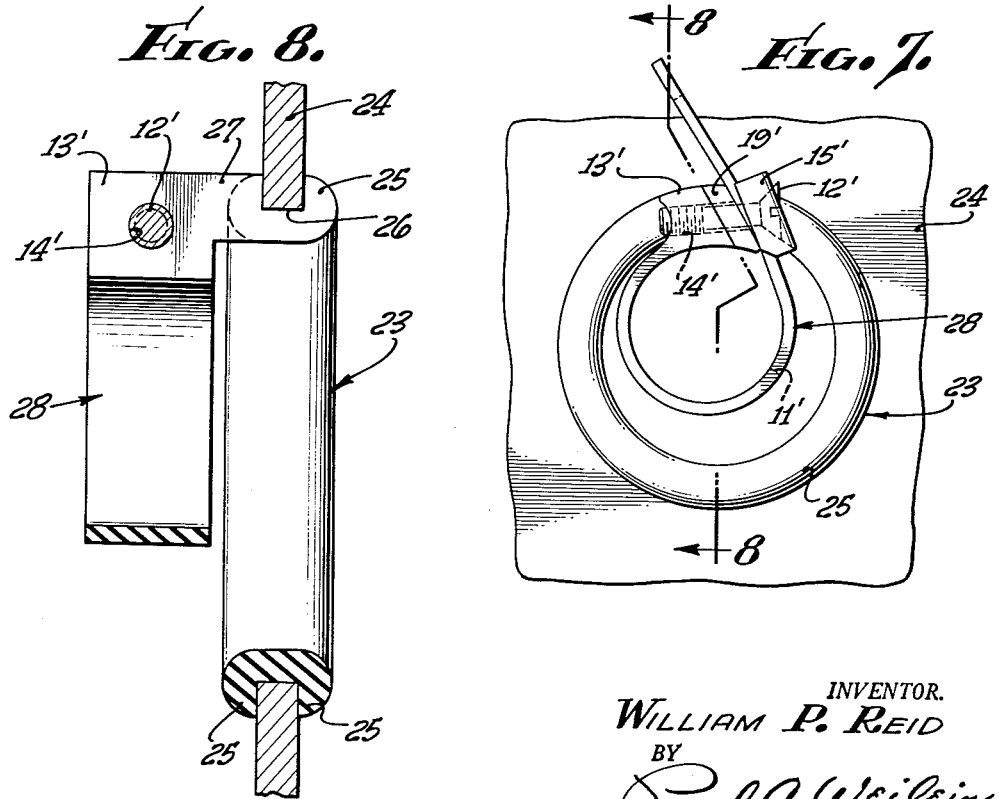

United States Patent Office 3,011,745
Patented Dec. 5, 1961

3,011,745
CLAMP FOR SUPPORTING WIRES
OR CONDUITS
William P. Reid, 2610 E. 67th St., Long Beach, Calif.
Filed June 1, 1959, Ser. No. 817,371
10 Claims. (Cl. 248—56)

This invention relates to clamps used in aircraft and other structures to support wires and conduits in a particular manner precluding chafing or other damage thereof.

In aircraft where wires and conduits are passed through bulkheads, protective grommets are mounted on the bulkheads so that the wires or conduits may be passed therethrough. In addition to these grommets, it is required that clamps be mounted for embracing and supporting the wires or conduits adjacent the bulkheads. Separate brackets are employed to mount the clamps and this entails use of extraneous fastening elements as well as the drilling of holes in the bulkheads to accommodate the mounting of the brackets.

The above noted use of grommets, clamps and brackets requires considerable handling of a number of separate parts, separate operations of a drill, and separate installation operations for the grommets, brackets and clamps, thereby proving objectionably time consuming and costly.

It is an object of the present invention to provide an improved clamp unit for the purpose described which will eliminate the objections heretofore encountered in the use of grommets and clamps and make it possible, quickly and safely, to support in the manner required, wires or a conduit which pass through a bulkhead or other structural element.

It is another object of this invention to provide a novel wire or conduit supporting unit for the purpose described which includes a pair of bands joined one to the other in side-by-side relation and constructed and arranged so that one band quickly and easily may be mounted on a bulkhead or other support to permit the wires or conduit safely to pass therethrough and to support the other band in the desired position for embracing and supporting the wires or conduit.

It is another object of this invention to provide a wire or conduit supporting unit such as described in which the two bands are joined to one another to serve as a protective grommet and a protective wire or conduit embracing clamp, respectively, in a manner such that installation of the unit quickly and easily may be effected.

Another object of this invention is to provide a wire and conduit supporting unit such as described wherein the two bands are split and joined to one side of the splits whereby the ends of both bands may be spread to facilitate reception of wires or the conduit to be supported.

It is a further object hereof to provide a wire or conduit supporting unit such as described which readily lends itself to being made of a plastic material having a high tensile strength and ability to withstand extreme temperatures, for example, a resin known as "nylon," or a similar material.

It is another object hereof to provide a wire and conduit supporting unit such as described wherein the split band thereof which serves as a supporting clamp for embracing the wires or conduit, may be adjusted to accommodate bundles of wires or conduits of different diameters.

It is another object hereof to provide a wire or conduit supporting unit such as described wherein portions thereof which serve as a grommet, correspond to a two-piece, self-locking grommet of the type forming the subject matter of my pending application for U.S. Letters Patent, Serial No. 759,540, whereby the grommet component of the unit may be quickly and securely locked in place against derangement or withdrawal.

A further object of this invention is to provide a wire or conduit supporting unit such as described wherein the band for embracing and supporting the wires or conduit is provided with novel fastening means for releasably securing the ends of the band together, and is constructed so that the fastening means, once installed on the band, does not have to be removed in order to spread the band for reception of the wires or conduit.

Other objects and advantages of the invention will be hereinafter described or will become apparent to those skilled in the art and the novel features of the invention will be defined in the appended claims.

Referring to the drawings:

FIG. 1 is a front elevation of a wire or conduit supporting unit embodying the present invention as mounted on a bulkhead;

FIG. 2 is a side elevation of the unit shown in FIG. 1, the bulkhead being shown in section;

FIG. 3 is a sectional view on an enlarged scale taken on the line 3—3 of FIG. 1;

FIG. 4 is a sectional view on an enlarged scale taken on the line 4—4 of FIG. 2;

FIG. 5 is an enlarged fragmentary sectional view taken on the line 5—5 of FIG. 4;

FIG. 6 is a perspective view of the unit with the separable parts thereof in position to be assembled;

FIG. 7 is an elevational view of a modified form of this invention; and

FIG. 8 is an enlarged sectional view taken on the line 8—8 of FIG. 7.

As shown in the accompanying drawing, a wire or conduit supporting unit embodying the present invention includes a pair of bands 1 and 2 joined one to the other in side-by-side relation and preformed to be generally circular in form. The band 1 is adapted to be mounted on a bulkhead or other supporting member, for example, the bulkhead 3 here shown, in such a manner that it will be retained on the bulkhead in position to have wires or a conduit pass therethrough and will support the band 2 in position to encompass and support the wires or conduit close to the band 1.

The band 1 may be constructed in any suitable manner provided it is joined to the band 2 and is adapted to be mounted on the bulkhead so that the wires or conduit to be supported will pass therethrough, and provided it will support the band 2 in position to embrace and support the wires or conduit adjacent the band 1.

As here shown, the band 1 is split to facilitate the mounting thereof on the bulkhead. The band 2 is also split to facilitate adjustment thereof and the placement of wires or a conduit therein. Both bands are formed of resilient material permitting spreading of the ends thereof.

As the bands 1 and 2 are split, the joining thereof in side-by-side relation is effected by means of a web portion 4 integral with both bands to one side of the splits therein. The web portion 4 spaces the bands axially from one another slightly so that they may be relatively expanded and contracted.

As it is desired to protect the wires or conduit, the bands 1 and 2 are preferably formed of a somewhat resilient plastic material which has a high tensile strength and ability to withstand extreme temperatures. It has been found that a resin known as "nylon" is a suitable material, but it is obvious that other plastic materials may be used.

As shown in FIGS. 1–6, the band 1 may be provided as a modified part of a two-part, self-locking grommet which constitutes the subject matter of my pending application for U.S. Letters Patent, Serial No. 759,540.

Accordingly, the band 1 may be mounted on the bulkhead by means of a split mounting ring 5 adapted to be fitted in an opening 6 in the bulkhead so that flanges 7 on the ring will abut opposite sides of the bulkhead to hold the ring in place. The ring 5 is provided with a tapered bore 8 for reception of the band 1, which latter is provided with peripheral and radially extending flanges 9 and 10 at the ends thereof, the flange 9 being of less radial extent than flange 10. With this arrangement, the end of the band 1 at which the smaller flange 9 is located is smaller in diameter than the other end and therefore is inserted into the larger end of the bore 8 in the mounting ring 5, in fitting the ring 1 into the band 5 to cause it to become locked therein as shown in FIG. 3. When pushed through the bore 8 so that the smaller flange 9 clears the smaller end of the bore 8, the band 1 will expand and thereby cause the flanges 9 and 10 to engage the outer faces of the flanges 7 on the ring 7, thereby locking the band 1 in place, with the band 2 disposed to one side of the bulkhead 3 as shown in FIGS. 2 and 3.

The band 2 is more flexible and thinner than the band 1 and is strap-like so that it may be adjusted to form a wire or conduit embracing loop of varying size according to the position of the free end thereof with relation to the fixed end joined by the web 4 to the band 1. Accordingly, the free end portion of the band 2 is formed with a slot 11 extending longitudinally thereof for reception of a screw 12 adapted to be threadedly engaged with the fixed end of the band. This fixed end is provided with a lug-like outwardly extended enlargement 13 having a screw-threaded bore 14 extending therethrough for reception of the screw 12.

The fastening means for releasably securing together the ends of the band 2 includes a small clamping plate 15 having a tapered opening 16 for reception of the tapered head of the screw 12. This clamping plate has a serrated surface 17 for gripping the outer surface of the band 2 and is provided with a flange 18 for embracing the outer edge of the band 2. The inner edge of the plate 15 may abut the adjacent surface of the flange 10 on the band 1. Thus engaged, the clamping plate 15 is held against angular movement about the axis of the screw 12 and cooperates with this screw to securely clamp the band, as desired, around the wires or conduit to be supported.

As it is desired that the screw be retained in place on the unit without being screwed into the threaded bore 14 on the fixed end of the band 2, the band 1 is provided with a lateral projection 19 at the end thereof opposite the end to which the web 4 is joined. This projection 19 has a smooth bore 20 therethrough through which the screw 12 may be extended. In this connection, it should be noted that the screw 12 has a smooth shank portion 12a of less diameter than the threaded portion, and of a length such that after forcibly pushing the threaded portion through the bore 20, the shank portion 12a will be disposed in the bore. When the screw 12 is unscrewed from the bore 14, the smooth portion 12a will remain in the bore 20 of the projection 19, the threaded portion preventing the screw from dropping out of the bore 20. The screw 12 need not be removed from the projection 19 in order that the free end portion of the band 2 be adjusted to enlarge or reduce the size of the loop formed by the band 2.

It will now be apparent that the bands 1 and 2 with the screw 12 and clamping plate 15 assembled thereon constitute a unit which, apart from the split mounting ring 5, is free from extraneous parts requiring separate handling. Accordingly, this unit is subject to a quick and easy installation on a bulkhead or other member through which the wires or a conduit are to be passed, a screw driver being the only tool required in effecting the desired installation.

As the two bands 1 and 2, also the mounting ring 5 are split, the installation of the unit readily may be effected after wires or conduit are extended through the opening 6 in the bulkhead 3. In this method of installation the ring 5 is spread to receive the wires or conduit and then fitted into the opening 6 in the bulkhead, after which the bands 1 and 2 are spread as a unit to receive the wires or conduit and the band 1 is then fitted into the mounting ring 5 so as to be locked therein. Following this mounting of the band 1, the band 2 may be tightened around the wires or conduit by pulling on the free end portion thereof and then manipulating the screw 12 so that it will be threadedly engaged in the opening 14 in the fixed end of the band 2. Upon now tightening the screw 12, the plate 15 is forcibly engaged with the band 2 to clamp it securely against the projection 19, which in turn, is forced into intimate contact with the enlargement 13 on the fixed end of the band 2. In this connection, it should be noted that the projection 19 has an inclined face 22 disposed at such an angle to the axis of the bore 20, that upon tightening the screw, the plate will tilt so that serrations 17 thereon nearer to the loop will be caused to bite into the band 2 as shown in FIG. 4, thereby assuring a reliable clamping action preventing slippage of the band 2.

Instead of assembling the bands 1 and 2 on the wires or conduit before inserting the band 1 in the mounting ring 5, the band 1 may be first fitted to and locked in the ring 5, after installation of the latter, with the screw 12 adjusted so that the band 2 is loose. After this mounting of the unit on the bulkhead, the wires or conduit may be inserted through the bands 1 and 2 and the screw 12 then tightened to clamp the band 2 as desired around the wires or conduit.

A modified form of this invention, as shown in FIGS. 7 and 8, differs from the first described form only as to the construction of the band 23 adapted to be mounted on the bulkhead 24. Accordingly, the band 23 may be formed of plastic material, also the band 1, and is split and provided with flanges 25 for engaging the sides of the bulkhead when mounted in the bulkhead opening 26, there being no locking ring as shown in FIGS. 1–6. Joined by a web 27 to the ring 23 is a clamping band 28 identical with the band 2 shown in FIGS. 1–6. Accordingly, the parts of the band 28 and the elements carried thereby, that correspond to the parts and elements shown in FIGS. 1–6, are identified by the same reference characters accompanied by the prime character.

It should be noted that the grommet structure of the grommet and clamp unit of this invention is formed, arranged and joined to the clamp element in a manner such that it has adequate strength to support the clamp element with wires or a conduit in the latter and will remain securely in place on the bulkhead effectively resisting stresses applied thereto along the wires or conduit.

In addition to the advantages hereinbefore noted, the clamp and grommet unit of this invention makes it possible to support wires or a conduit in the clamp element of the unit so that the wires or conduit will be centered in the grommet element free from contact therewith.

While specific structural details have been shown and described, it should be understood that changes and alterations may be resorted to without departing from the spirit of the invention as defined in the appended claims.

I claim:

1. A device for supporting wires or a conduit that are to be passed through an opening in a bulkhead or other member comprising: a circular split resilient mounting band; means for securing said band in said opening; a split, flexible clamping bands; means fixing one end of said clamping band to one end of said mounting band to join said bands together in side-by-side relation with the other end portion of said clamping band movable toward said fixed end of said clamping band to form a loop around the wires or conduit; means projecting from the other end of said mounting band so as to be engageable by said other end portion of said clamping band;

and means for releasably clamping said clamping band around the wires or conduit.

2. A device for supporting wires or a conduit that are to be passed through an opening in a bulkhead or other member comprising: a circular split resilient mounting band; means for holding said band in said opening; a split, flexible clamping band; means fixing one end of said clamping band to one end of said mounting band so that said bands are disposed in side-by-side relation; the other end of said clamping band being movable relative to said fixed end thereof; said clamping band having a slot therein; fastening means extended through said slot and engageable with said fixed end of said clamping band to releasably clamp the clamping band around the wires or conduit; and means on said mounting band through which said fastening means extends.

3. A device for supporting wires or a conduit that are to be passed through a bulkhead comprising: a circular split mounting ring adapted to be mounted in an opening in the bulkhead; flanges on said ring for engaging the sides of the bulkhead to hold the ring in said opening; said ring having a tapered bore therethrough; a circular split band having radial flanges on the ends thereof; one of said flanges on said band being of less radial extent than the other; the end of said band having the smaller flange being insertable through said tapered bore from the wider end of the bore to engage the flanges on the band with the flanges on the ring to lock the band in the ring; a circular split clamping band; means joining said bands at corresponding end portions so as to leave the other end portions free; and means for releasably clamping said clamping band around the wires or conduit.

4. A device for supporting wires or a conduit that are to be passed through a bulkhead comprising: a circular split mounting ring adapted to be mounted in an opening in the bulkhead; flanges on said ring for engaging the sides of the bulkhead to hold the ring in said opening; said ring having a tapered bore therethrough; a circular split band having radial flanges on the ends thereof; one of said flanges on said band being of less radial extent than the other; the end of said band having the smaller flange being insertable through said tapered bore from the wider end of the bore to engage the flanges on the band with the flanges on the ring to lock the band in the ring; a circular split clamping band; a web portion joining said bands at one side of the splits on the bands; a projection on said first named band disposed opposite one end of said clamping band; and means on the clamping band extending through said projection and operable for releasably clamping the clamping band around the wires or the conduit.

5. A device for supporting wires or a conduit to be passed through an opening in a bulkhead or other member comprising: a split mounting band adapted to be mounted in said opening; means for holding said band in said opening; a flexible split clamping band; means integral with and joining said mounting band to said clamping band so that said bands are united in side-by-side relation with said clamping band adapted to be looped around said wires or conduit; said clamping band having a screw-receiving bore therein; an apertured projection on said mounting band disposed opposite said bore; and said clamping band having a slot therein through which a screw may be inserted so as to extend through said apertured projection and into threaded engagement with said bore for releasably clamping said clamping band around said wires or conduit.

6. A device for supporting wires or a conduit to be passed through an opening in a bulkhead or other member comprising: a split mounting band adapted to be mounted in said opening; a flexible split clamping band; means joining one end of said mounting band to an end of said clamping band so that said bands are united in side-by-side relation with said clamping band adapted to be looped around said wires or conduit; said clamping band having a bore in one end thereof for reception of a screw; said clamping band having a slot extending longitudinally thereof through which a screw may be passed and threaded into said bore for releasably clamping said clamping band around the wires or conduit; and a lateral extension on said mounting band; said extension having a bore therethrough through which said screw is passed for engagement with said bore in said clamping band.

7. A device for supporting wires or a conduit to be passed through an opening in a bulkhead or other member comprising: a split mounting band adapted to be mounted in said opening; a flexible split clamping band; means joining said mounting band to said clamping band so that said bands are united in side-by-side relation with said clamping band adapted to be looped around said wires or conduit; said clamping band having a bore in one end thereof for reception of a screw; said clamping band having a slot extending longitudinally thereof through which a screw may be passed and threaded into said bore for releasably clamping said clamping band around the wires or conduit; and a lateral extension on said mounting band disposed between the ends of said clamping band and having a bore therethrough through which said screw is passed for engagement with said bore in said clamping band; said lateral extension having an inclined face engageable by a portion of said clamping band when the latter is clamped around said wires or conduit.

8. A device for supporting wires or a conduit to be passed through an opening in a bulkhead or other member comprising: a split mounting band adapted to be mounted in said opening; a flexible split clamping band; and a pair of extensions on said mounting band projecting laterally from one side thereof adjacent the split; one of said extensions being integral with one end of said clamping band and having a bore therein; the other of said extensions being disposed between the ends of said clamping band and having a bore therethrough aligned with said first mentioned bore; said clamping band having an opening adapted to register with said bore whereby a screw may be extended through said opening in said clamping band and into said bores to clamp the clamping band around wires or a conduit.

9. A device for supporting wires or a conduit to be passed through a bulkhead or other member comprising: a resilient split mounting band adapted to be mounted in an opening in said bulkhead or other member; a resilient and split clamping band; means joining one end of said mounting band to an end of said clamping band so that said bands are united in side-by-side relation with said clamping band adapted to be looped around said wires or conduit; said clamping band having a bore in one end thereof for reception of a screw; said clamping band having a slot through which a screw may be passed and threaded into said bore for releasably clamping said clamping band around the wires or conduit; an extension on said mounting band disposed between and engageable by end portions of said clamping band; said extension having a bore therethrough adapted to receive said screw; and a clamping plate having an opening therein for reception of said screw; said plate being engageable with said clamping band to clamp said band against said extension.

10. A clamp for supporting wires or a conduit that are passed through an opening in a bulkhead comprising: a transversely split mounting band; means for retaining said mounting band in said opening; a flexible strap member operable for forming a loop around said wires or conduit; means fixing one end only of said strap member to one end of said mounting band and disposing the remainder of said strap member including the other end thereof on one side of and normally free of connection with said mounting band in position for forming a loop around the wires or conduit by moving said other end of the strap member opposite said fixed end of said strap member; and means engageable with said ends of said strap member for clamping said strap member as a supporting band around said wires or conduit extending through said mounting band.

References Cited in the file of this patent

UNITED STATES PATENTS

| 1,364,529 | Thomas | Jan. 4, 1921 |
| 2,362,160 | Robertson | Nov. 7, 1944 |
| 2,413,927 | Robertson | Jan. 7, 1947 |
| 2,592,130 | Erb | Apr. 8, 1952 |
| 2,897,533 | Bull et al. | Aug. 4, 1959 |

FOREIGN PATENTS

| 759,179 | Great Britain | Oct. 17, 1956 |